April 9, 1968 F. L. SCHULTZ Re. 26,371

CONTINUOUS FORM ENVELOPES

Original Filed June 23, 1961 2 Sheets-Sheet 1

INVENTOR
FRANK L. SCHULTZ
John E. Wise
AGENT

CONTINUOUS FORM ENVELOPES

Original Filed June 23, 1961 2 Sheets-Sheet 2

INVENTOR
FRANK L. SCHULTZ
Glenn E. Wise
AGENT

United States Patent Office

Re. 26,371
Reissued Apr. 9, 1968

26,371
CONTINUOUS FORM ENVELOPES

Frank L. Schultz, P.O. Box 253,
Alamo, Tex. 78516

Original No. 3,140,816, dated July 14, 1964, Ser. No. 119,176, June 23, 1961. Application for reissue June 6, 1967, Ser. No. 651,060
5 Claims. (Cl. 229—69)

Matter enclosed in heavy brackets [ ] appears in the original patent but forms no part of this reissue specification; matter printed in italics indicates the additions made by reissue.

*ABSTRACT OF THE DISCLOSURE*

*Continuous form mailing envelopes are formed by bringing together two continuous webs of transparent thermoplastic material into contacting relationship after one of the webs is first provided with longitudinally spaced transverse cut-outs whose ends terminate inwardly of the longitudinal edges of the web. At least one of the webs is then coated on the exterior with an ink which is both adherent to the thermoplastic web material and to which printed, typed or stamped indicia will adhere, the coating rendering the coated web translucent or opaque, and also defining a transparent window area if it is on the web which is to be the front of the mailing envelope. Adjacent sides of the webs are then heat-fused together along lines adjacent the longitudinal edges thereof, and also along longitudinally spaced transverse lines so as to form individual envelope compartments. Next the webs are perforated and punched adjacent their longitudinal edges to provide perforations suitable for machine feeding, for facilitating severance of individual envelopes, one from the next, and for facilitating opening of the envelopes.*

This invention pertains to continuous form stationery, and more particularly to strip-type, series-connected mailing envelopes.

Modern commercial requirements have led to the development of various types of stationery in continuous strip form which may be fed through a typewriter or other imprinting, addressing or recording machine without the necessity of repetitious insertion of individual units. After appropriate inscription or other machine operation, the series-connected units are divided from the supply strip along transverse weakened lines.

Prior to this invention, as far as I am able to determine, all practical mailing envelopes of the continuous form type have been made of untreated paper, paper and foil laminates, or coated paper. No successful continuous envelope of the type in question, to my knowledge, has been formed by utilizing as the envelope stock or body material initially transparent heat-sealable thermoplastic film material. (Throughout the remainder of this application, the term "initially transparent" is defined to mean that the stock or body material used in forming the envelopes of the invention is transparent or substantially transparent at the beginning of the envelope-making process, prior to certain operations, to be described, subsequently performed on the stock or body material which alter its transparency.) This is true even though the economic merits of certain heat-sealable thermoplastic film materials, for example, polyethylene webbing, versus paper have long been known. The main reasons that plastic film materials have not been adopted for use in making envelopes for mailing purposes appear to be: (1) because the films as normally received from the producer do not take printing or individual addressing well, that is, most printing, and especially typewriting, imposed thereon either does not adhere at all, or smears or off-sets to varying degree in handling due mainly to the smoothness of the film's surface, (2) because the films are normally transparent, as received, and users usually desire to have their mailing covers for various classes of mail to be non-transparent to some extent. For example, users normally desire to have their First Class mail enveloped in substantially opaque material except in those instances where windowed envelopes are desired, and (3) because, due to their flexibility, plastic webs are more difficult to process and handle than paper which is normally less flexible.

This invention, however, overcomes all of these main objections and provides an envelope formation wherein thermosensitive plastic film, after certain operations are performed thereon, is rendered highly suitable for mailing covers. This desirable result is achieved by superimposing in contacting relationship two webs of thermoplastic, heat-sealable film, of a width slightly greater than the completed envelopes are to be, preferably, but not necessarily, after certain cut-outs (for facilitating later stuffing or filling of the envelopes with mailing matter) are formed in one of the webs. Next, the exterior or non-contacting surface of either or both webs is partially or completely coated with a flat or semi-gloss ink of a type which will adhere to such film so as to render the webs at least translucent to the extent required by postal regulations for the various classes of postal matter. (The term "at least translucent" is defined through the remainder of this application to mean that, subsequent to the coating operation, the light-passing capabilities of the initially transparent or substantially transparent stock or body material is diminished sufficiently, by the coating applied thereto, to render the coated stock material either translucent or opaque.) This ink coating also serves the additional function of providing a base to which additional printed, typed or stamped impressions will readily adhere, as well as providing a medium for forming artistic representations. After this coating operation, the superimposed webs pass through a heat sealing device which, by heating selected portions of the webs, causes the webs to be fused together so as to form individual envelope compartments. Next the joined webs are passed through a perforating and punching device which provides machine-feeding means along the marginal edges of the webs as well as forming means facilitating later removal of these marginal edges from the finished continuous envelope strip and for detaching adjacent individual envelopes one from the next. (Optionally, if the finished envelope strip is to be friction fed, as on a standard typewriter, the marginal machine feeding means may be omitted.) The punching and perforating device also concurrently forms means whereby individual envelopes may be easily opened by the ultimate addressee, these means including air venting means which allow excess air to escape from the individual envelopes during stuffing and sealing operations, i.e., when material to be mailed is being inserted into the envelope and then sealed. After the perforating and punching operation, the strip of envelopes is ready for use in high-production business addressing, printing, stamping and the like equipment, and may be shipped to the user in either rolled or accordion-folded (zig-zag) form.

At the point of use one end of the envelope strip is inserted into a business machine of the type aforementioned, e.g., a typewriter, and is fed positively into the machine by means of the marginal feeding means provided on the envelope strip margins. At this juncture any desired typing or printing is impressed upon the original ink coating, after which the individual envelopes may be detached from each other for individual manual or machine stuffing or left in strip form for manual or machine stuffing and then detached for final sealing and then mailing. A description of the final sealing technique will follow.

One object of the invention is to improve the construction of continuous series-connected detachable envelopes whereby they may be more economically manufactured.

Another object of the invention is to provide a continuous strip of series-connected envelopes formed of heat-sealable plastic film material previously considered unsuitable for forming exterior mailing covers.

Another object of the invention is to provide means for preparing plastic film whereby it is rendered acceptable for mailing covers, whereby it is rendered acceptable as a base for receiving printing, typing, and the like, and whereby stuffing means are provided.

Another object of the invention is to provide, in a continuous form envelope assembly, means to facilitate stuffing operations, which means include air venting provisions for sealing as well as a cut-back entry to the interior of each individual envelope.

Another object of the invention is to provide a plastic envelope having means whereby it may be easily opened when received by the addressee, and wherein a portion of the opening means serve as a means for venting excess air from the interior of an envelope as it is being filled with mailing matter and sealed.

Another object of the invention is to set forth a method of forming a strip of continuous series-connected envelopes of thermoplastic, heat-sealable material.

Another object of the invention is to provide a window-type continuous series-connected envelope assemblage formed entirely of coated thermoplastic material.

With the above primary and other objects in view as will more fully appear in the remainder of the specification and claims, the invention intended to be protected by Letters Patent consists of the features of construction, the parts and combinations thereof and the method of making same and the mode of operation, or their equivalents, as are hereinafter described or illustrated in the accompanying drawings.

In the drawings, which form a part of this application, there is illustrated a method and apparatus for producing window-type series-connected envelopes suitable for first class mail covers. The illustrated embodiment is the preferred, but obviously not necessarily the only form of embodiment of the invention:

FIGURE 3 is a three-dimensional view showing a roll of my continuous series-connected envelopes ready for feeding into a business machine for final printing or stamping or the like;

Figure 1:
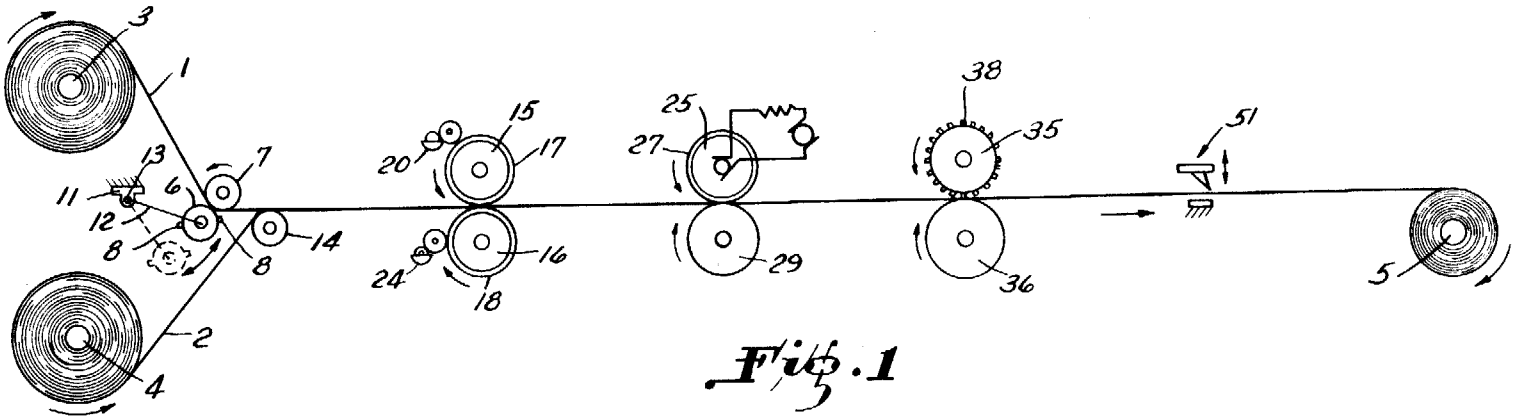
FIGURE 1 is a schematic elevational view illustrating a method of making the continuous form envelopes of the invention as well as the apparatus required to carry out the aforesaid method.
Figure 2:
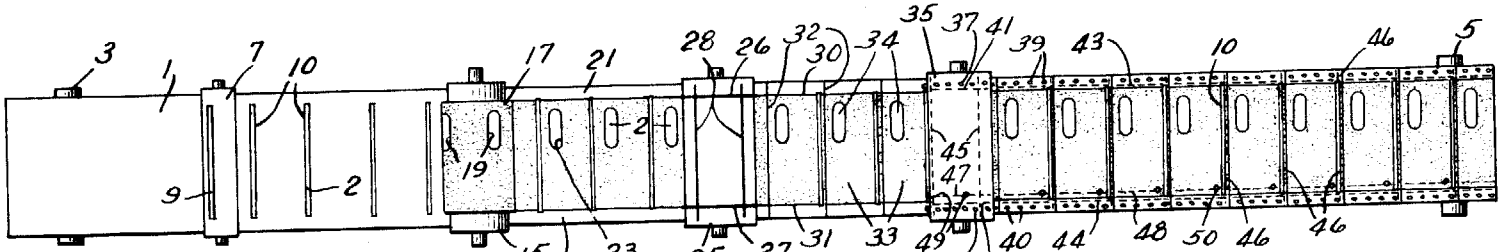
FIGURE 2 is a schematic plan view of the arrangement of FIGURE 1.

Referring now to FIGURES 1 and 2 of the drawings by reference numerals, there is seen in schematic form the apparatus for making continuous form window-type mailing envelopes by the preferred method of my invention. More specifically, continuous, equal-width, vertically aligned webs 1 and 2 of transparent, heat-sensitive, thermoplastic material (preferably polyethylene) are mounted on reels 3 and 4, respectively, from which the webs are continuously drawn by rotatably driven take-up reel 5. Shortly after being drawn from reel 3, web 1 preferably passes between a pair of rotatably driven die-cutting rollers 6 and 7. Roller 6 is the male member of the pair and carriers on its periphery a plurality of radially protruding die portions 8, 8 which cooperate with coacting conventional female die depressions 9 in roller 7 to form transversely extending, elongated, spaced rectangular cut-outs 10, 10 in web 1 as it passes between rollers 6 and 7. Cut-outs 10 aid in facilitating stuffing as will later be described. Male roller 6 is preferably mounted so that it may be moved away from roller 7 when cut-outs 10 are not desired in the finished envelopes, and for this reason, roller 6 is diagrammatically shown in FIGURE 1 to be supported from a fixed support 11 by means of an arm 12 pivoted at 13 to support 11 whereby the roller 6 may be swung to the dotted line locations shown. After cut-outs 10, 10 are formed, web 1 moves away from rollers 6 and 7 substantially horizontally oriented. Simultaneously, web 2, shortly after being drawn off reel 4, at the same lineal speed as web 1, passes over guide roll 14 where its upper surface is brought into full width contact with the lower surface of web 1. Web 1, which now contains cut-outs 10, and web 2 now continue in contacting relationship through upper and lower rotatably driven printing rollers 15 and 16 which carry impression surfaces 17 and 18, respectively, the web-engaging peripheries of which are made to travel at the same speed as the lineal speed of webs 1 and 2. Impression surface 17 having non-printing areas 19 receives an ink supply from a reservoir 20 by means of conventional intermediate transfer rollers, as shown, and in rotating coats the entire upper surface of web 1, except the marginal areas 21 and 22 and the window areas 23 with a layer of polyethylene-adherent ink, which renders the coated portion of web 1 translucent or opaque as desired by an individual user. Concurrently, impression surface 18 receives an ink supply from a reservoir 24 by means of conventional intermediate transfer rollers, as shown, functions to coat, with an ink identical to that being applied to web 1, the entire lower surface of web 2 except for marginal edge areas (not shown) coextensive with areas 21 and 22 of web 1, which are left uncoated. No window areas are formed in the coating on web 2.

Areas 21 and 22, and the identical marginal areas on web 2 are not ink coated for reasons of economy since the web portions containing these marginal areas are later removed and discarded and do not form any part of the ultimate individual envelopes produced by the practice of this invention.

One polyethylene-[adjerent] *adherent* ink which I have found to be suited for use in coating webs 1 and 2 as described is flat or semi-gloss ink produced by the Interchemical Corporation of Chicago, Illinois. I have further found that, although either the flat or semi-gloss ink gives satisfactory results in rendering the webs 1 and 2 substantially opaque where applied, the flat ink takes typing impressions better, i.e., typed printing will adhere more tenaciously and will thus produce more lasting and legible results when impressed on the flat ink. This is especially important when addresses or the like are to be impressed on the coatings by means of typewriters or addressing machines.

Proceeding from the coating station, the webs, still in superimposed contacting relation, travel a distance sufficient to allow the ink coatings, previously described, to dry and then pass into a heat-sealing device between heat-sealing roller 25, having raised, preferably electrically heated, web contacting portions 26, 27 and 28 on the periphery thereof, and a back-up roll 29 directly beneath the roller 25. The web contacting portion of roller 26 and roll 29 are rotatably driven at the same speed as the lineal speed of the webs 1 and 2, and as heated portions 26 and 27 contact web 1, they cause the immediately subjacent plastic material to soften and fuse together along very narrow interrupted (by cut-outs 10) heat seal lines 30 and 31 which extend longitudinally of the webs 1 and 2, preferably, but not necessarily, coincidental with the edges of the coated portions of the webs. Concurrent with the formation of heat seal lines 30 and 31, heated web contacting portions 28, 28 contact web 1 and in like manner form very narrow, spaced, transverse heat seal lines 32, 32 completely across webs 1 and 2, these latter lines being provided to form the bottom edges of the individual envelopes in my series-connected structure and being positioned away from the windows 23 a distance equivalent to that usual in conventional, paper windowed envelopes. Continuity and integrity of all of the heat seal lines is insured by the squeezing action of portions 26, 27 and 28 coacting with roll 29, between which webs 1 and 2 are pressed together as the seal lines are being formed.

At this stage in the process, by means of the seal lines 30, 31 and 32, webs 1 and 2 are joined together into a unitary laminated strip for the first time. As a matter of descriptive convenience joined webs 1 and 2 will henceforth, for the remainder of this description, be termed a strip.

Moving away from the heat sealer, the strip, as seen in FIGURE 2, includes a plurality of spaced envelope fronts 33, 33 and a plurality of envelope backs 34, 34 (as seen through transparent windows 23, 23 in fronts 33, 33 in FIGURE 2) defined by heat seal lines 30, 31 and 32.

It will be noted that, at this stage of the process, it would be possible to insert mailing material between a front 33 and a back 34 by way of a cut-out 10 in each front 33 if such were desirable. In practice, however, no material is inserted at this juncture.

The strip now enters a punching and perforating device, composed of a male punching and perforating roll 35 and a female punch-receiving and backup roll 36, and passes between rolls 35 and 36. These two rolls 35 and 36 are rotatably driven in synchronism with the strip. Roll 35, near each end thereof, carries a row of round radially extending punches 37 and 38, respectively, which as the roll rotates form a plurality of evenly and longitudinally spaced circular holes 39 and 40 between the opposite marginal edges of the strip and the two longitudinally extending heat seal lines 30 and 31. These holes 39 and 40 form machine-feeding means whereby my finished envelope strip may later be positively drawn into a conventional pin-feed-including typewriter or similar business machine for additional processing. Roll 35 also carries, at both ends thereof, a row of radially extending perforating knives 41 and 42, respectively. These rows of knives are spaced slightly toward the center of the roll from the rows of punches 37 and 38 and are parallel thereto. As roll 35 rotates, knives 41 and 42 form a line of spaced perforations, 43 and 44 respectively, through each edge of the strip just outside of heat seal lines 30 and 31. The perforation lines 43 and 44 provide a means whereby the machine-feeding-means-including marginal edges of the strip may be detached from the remainder of the strip after they have served their purposes as hereinabove described.

Roller 35, in addition to the previously mentioned punches and knives, carries a plurality of rows of perforating knives 45, 45. Rows 45 extend parallel to the longitudinal axis of roll 35 and radially from the periphery of the roll. As roll 35 rotates, knives 45 are positioned so as to form transversely oriented rows of spaced perforations 46, 46 through and substantially across the strip immediately behind each envelope's bottom-closing heat seal lines 32, 32, at a location, in this preferred embodiment, coincident with the leading edges of cut-outs 10, 10. It will be obvious that rows 46 thus provide means whereby individual envelope units may be detached from the strip. The individual slits which combine to form the rows of perforations 46, 46, it will be noted, do not communicate with the machine-feeding holes 39 and 40, nor does any end slit extend to a margin of the strip. Thus the pin feed holes are not weakened or mutilated by perforations 46, nor is the strip itself weakened at its edge to the extent that it might accidentally rip transversely during further processing.

Roll 35 further carries a row of radially extending perforating knives 47 spaced somewhat toward the center of the roll 35 from and parallel to the row of knives 42. The purpose of the row of knives 47 is to form, as roll 35 rotates, a longitudinally extending line of spaced perforations 48 through the strip at a location approximately one-half inch inside of and parallel to the heat seal line 31. Line 48 forms a part of a novel envelope opening means which will be further defined as the description proceeds.

The final strip-treating means carried by rolls 35 is a plurality of spaced, square punches 49, 49 which extend radially from roller 35 on the same line defined by the row of knives 47. As roll 35 rotates, punches 49, 49 are positioned so as to form punched holes 50, 50 in the strip on line with perforations 48 but spaced slightly behind the bottom or trailing edge of cut-outs 10, 10. Each hole 50 not only forms an air release vent of great importance during stuffing and top sealing of individual envelopes, but also is in communication with one of the individual perforations which form perforated line 48 for a purpose which will be more fully described hereinbelow.

The roll 36 is provided with the female indentations necessary to coact with the various punching and perforating elements on roll 35, as is conventional.

After leaving the punching and perforating device, the strip of envelopes winds up on take-up reel 5 and is ready for shipment to a user. Although I prefer to ship my strips of series-connected envelopes in roll form, the strips may also be shipped in conventional accordion folded or zig-zag fashion or, optionally, by employing a cut-off device, as generally and diagrammatically illustrated at 51 in FIGURE 1, the strip may be completely transversely severed along each transverse perforated line 46 and the individual envelopes, after detachment, may be shipped to a user in any manner deemed desirable. (In this latter case, the strip would be made without the pin-feed margins.)

Timing of the various operating units which form the production line illustrated in FIGURES 1 and 2 may be controlled by a plurality of conventional individual synchronizing devices, one controlling each unit, or all of the units may be positively connected together by appropriate gearing and shafting. (Or, optionally, the various operations may be completely independent of each other and be completed at different times.)

Figure 3:
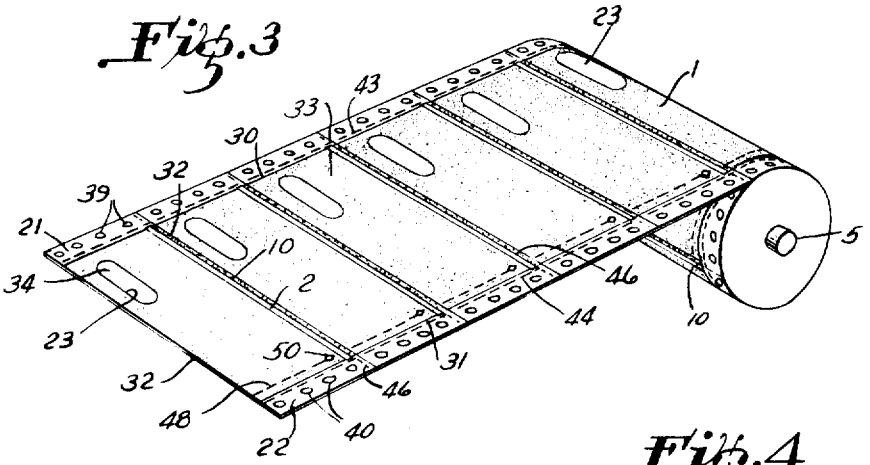

Referring now to FIGURE 3, there is seen a roll of my series-connected envelopes ready to be inserted into a pin-feeding type business machine for further processing, for example, for typing or printing return addresses in the upper left-hand corner of each envelope. The pins of the pin feed of such machines protrude successively into holes 39 and 40 at the opposite margins of my envelope strip to draw the strip into the machine as desired by an operator. After each individual envelope, beginning with the end unit, has been typed or printed upon, or otherwise additionally processed, it may either be detached from its neighbor along a perforated line 46, either before or after stuffing, after which the uncoated margins are removed from the envelope edges along the perforated lines 43 and 44, respectively, or the strip may be kept whole for shipment elsewhere for later detachment and then stuffing, or stuffing and then detachment. Detachment and margin removal can be done by hand or on a conventional "burster" machine such as those sold by Moore Business Forms, Inc.

If the individual envelopes which comprise my envelope strip are stuffed with mailing material prior to their detachment one from another, such material would be inserted in between the fronts 33 and backs 34 by way of the cut-outs 10 provided for this purpose. During the stuffing operation, any excess air within a particular envelope not exhausted through a cut-out 10 would find its way out through a hole 50.

Cut-outs 10 are made as long as possible within the limits prescribed by perforated lines 43 and 44. That is, the cut-outs do not extend to the locus of these lines of perforations, but end just short thereof, slightly beyond heat seal lines 30 and 31.

If the envelopes are detached each from the others, along the perforated lines 46, prior to stuffing, then, since lines 46 are in every instance coincident with the top edge of the cut-outs 10, such detachment leaves the entire top of each envelope between heat seal lines 30 and 31 open for stuffing purposes.

Figure 4:
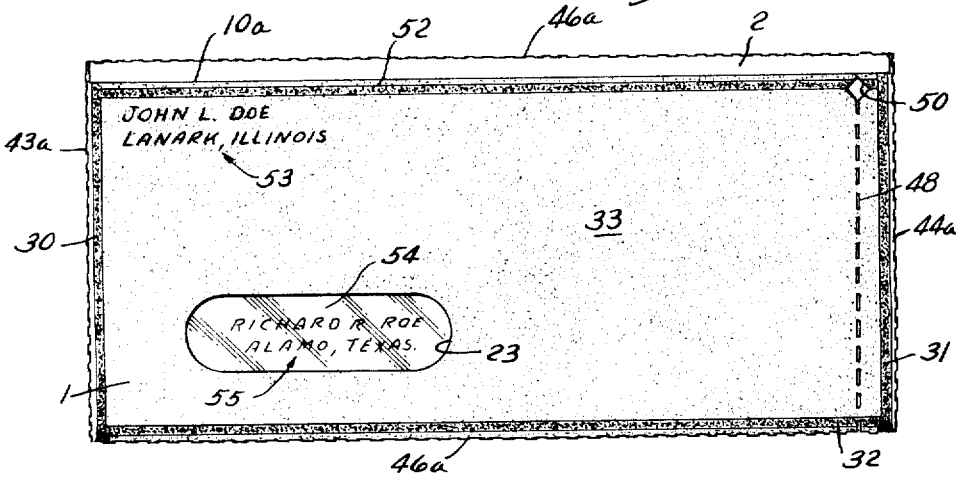
FIGURE 4 is a view showing a single envelope after it has been detached from the strip of FIGURE 3 and stuffed, and after its top has been sealed but prior to a final trimming operation; and, FIGURE 5 is a view showing a single envelope as it would appear when partially opened by an addressee.

To proceed, however, whether the individual envelopes are stuffed and then detached, or detached and then stuffed, any one of the envelopes after stuffing, detachment, margin removal and top sealing would appear as seen in FIGURE 4.

Figure 5:
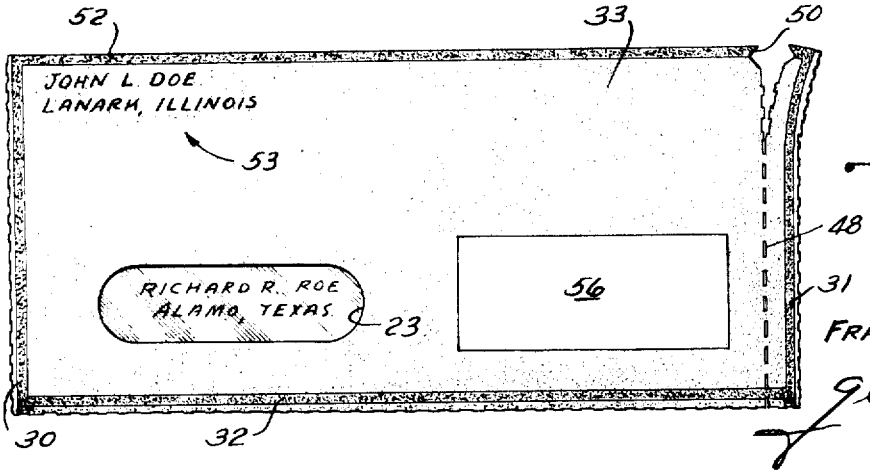

In FIGURE 4, the numerals 43a, 44a and 46a denote the envelope-attached ragged remains of perforation lines 43, 44 and 46 after the margins 21 and 22 have been detached from the envelope and after this envelope has been detached from the strip. (Some conventional "bursters" are designed to trim margins 43a and 44a "clean" or straight also, but such case is not illustrated herein.) Numerical 33 again denotes the front face of the envelope which is opaque with the exception of the transparent, uncoated window-forming portion 23. The numeral 10a denotes what now remains of cut-out 10. Numerals 30, 31 and 32 denote, respectively, the envelope's left, right and bottom edge heat-seal lines. Numeral 52 represents a seal line sealing the top of the envelope. Preferably, seal line 52 is formed by a conventional edge heat sealer to form a narrow seal line similar to lines 30, 31 and 32. However, to adapt this envelope for household as well as commercial usage, a line on conventional "moisten and seal" adhesive (not shown) may be deposited on the inner side of either or both webs, coincident with the location of seal line 52 as seen in FIGURE 4, whereby the envelope may be top-sealed merely by wetting the adhesive and pressing the tops of front 33 and back 34 together. Numeral 50 again denotes the air vent hole which, in addition to serving as a vent, communicates with one of the individual slits of perforation line 48 thus forming a tear starting means for my novel opening feature. By locating hole 50 and the aforementioned slit in communication I have found that during opening of my envelopes, as seen in FIGURE 5, the webs 1 and 2 are always ripped apart along line 48, that is, with this expedient the rip does not wander randomly away from line 48 during envelope opening.

Numeral 53 in FIG. 4 designates generally a typical return address typed or printed upon the initial ink coating subsequent to the formation of the envelope strip as set out in FIGURES 1 and 2. Obviously any second impression typed or printed on the initial coating should be of a different color so as to be plainly discernible.

Numeral 55, in FIGURE 4, designates generally a typical address shown printed or otherwise impressed upon a typical piece of mailing matter 54 sealed within the envelope and seen through the transparent window-area 23.

Before mailing the envelope of FIGURE 4, the excess material lying above the upper edge of heat seal line 52 is trimmed off. It will be noted that such trimming passes through hole 50 (see FIGURE 5) and leaves only portions of the perimeter forming material of original hole 50. The trimming step is preferably performed concurrent with the formation of heat-seal line 52 by means of a conventional heat-sealer and trimmer device, but obviously trimming may take place before or after the heat seal line 52 (or other sealing means) is completed.

Referring now to FIGURE 5, there is seen one of my envelopes as it would appear when received and partially opened by an addressee. Opening is accomplished by grasping the envelope material on opposite sides of line 48 adjacent hole 50 and pulling in opposite directions. As previously mentioned, entry hole 50 insures that tearing will take place along line 48. Obviously, once the right end of the envelope is torn off or substantially off, the mailing material therein may be removed in the usual manner.

Although the illustrated embodiment relates to the formation of a strip of but a single width of envelopes, it is obvious that, with slight modifications, strips containing a plurality of side by side envelopes could be produced.

The envelopes of this invention may be formed of web material of any practical thickness desired. Obviously, the thicker the material employed, the stiffer the individual finished envelopes will be. Also the ink coating may be applied to produce complete opacity of the webs, or in lighter coats to merely render the webs translucent. If thin plastic webs are employed, it is sometimes found desirable to attach a conventional adhesive-backed unprinted paper label or patch to the front of the finished envelope as shown at 56 in FIGURE 5. By this expedient, a forwarding address may be written on the patch with pen or pencil with the assurance that the writing instrument will not dig into and tear the envelope. With thicker films, such a patch is not necessary.

Although the illustrated embodiment relates to side filling, end opening, window-type, First Class mailing envelopes, the method of the invention with obvious modification is equally applicable to the production of other types of envelopes for First Class as well as other classes of mail. For example, in forming mailing envelopes acceptable as Third Class mailing covers, only small portions of the front web would be coated during formation of the envelope strip. With the remainder of each envelope's front and back left uncoated, various advertising matter, or the like, inserted into the envelope would be clearly visible through the uncoated portions of each envelope at all times. The small portions of each envelope which are coated are for the purpose of subsequently receiving postal indicia, advertising, or other printed, typed or written indicia as desired by a particular user.

Although the illustrated embodiment relates to end-opening envelopes, it is obvious that the method could be easily modified to form bottom or top-opening envelopes. Also, although the opening feature 48, 50 is shown located at the right-hand side of the individual envelope, such location is illustrative only. In actual practice on end-opening envelopes, it is preferred to place the opening feature closely adjacent and parallel to the left-hand edge of the envelopes although, of course, it may be located wherever a user should find most convenient.

Having now completely described one embodiment of my continuous form, series-connected envelope assembly and the method of making same, what I claim as novel and desire to secure by Letters Patent is:

1. A mailing cover comprising: a front formed of *a generally rectangular flat sheet of* initially transparent *thermoplastic* material; first coating means on *the exterior of* said front rendering *at least part of* said front at least translucent; a back formed of *a generally rectangular flat sheet of* initially transparent *thermoplastic* material *superimposed upon the first-named sheet*; additional coating means on *the exterior* of said back rendering said back at least translucent, *said first coating means being an ink which is adherent to said thermoplastic material and which is receptive to typed or printed indicia and which also defines a transparent window area on said front*; and *heat seal* means joining said front and said back together *along lines adjacent marginal portions thereof, along which lines said front and back are fused to one another* to form an envelope pocket.

2. An assembly of series-connected envelopes comprising: a superimposed pair of webs, each of said webs being formed of initially transparent *thermoplastic* sheet material, one of said webs having [thereon] *on the side thereof which is disposed away from the other web* [coated areas] *coating means* forming at least translucent [backs] *back areas* for said envelopes and the other of said webs having

[thereon] *on the side thereof which is disposed away from the first-named web coating means forming* at least partially at least translucent [fronts] *front areas* for said envelopes, *said coating means being an ink which is adherent to said thermoplastic material and which is receptive to typed or printed indicia and which also defines transparent window areas on the front areas of said envelopes;* and *heat seal* means joining [each front to a back] *adjacent sides of said superimposed webs together along lines* adjacent marginal portions thereof, *along which lines said webs are fused to one another* to provide a series of connected individual envelope pockets.

[3. The combination of claim 2 wherein at least one of said one or other webs is formed of transparent thermoplastic material and wherein the coated areas on said at least one web are comprised of an ink which is adherent to said thermoplastic material and receptive to typed or printed indicia.]

[4. A mailing envelope comprising: a front; a back; said front being formed of initially transparent material; coating means on said front, said coating means rendering said front at least translucent except for a window-forming portion, said window-forming portion being completely surrounded by said coating means; and means joining said front to said back.]

[5. A mailing cover comprising: a front formed of initially transparent thermoplastic material; first coating means on said front rendering said front at least translucent except for a window-forming area thereof; a back formed of initially transparent thermoplastic material; additional coating means on said back rendering said back at least translucent; and means joining said front and said back together, said window-forming portion being substantially rectangular in shape and having at least two intersecting sides bordered by said first coating means.]

6. Opening means for an envelope of the type having a rectangular front, a rectangular back and means joining the marginal edges of said front to the marginal edges of said back along each side thereof comprising: a line of perforations through said front; a second line of perforations through said back, said second line being aligned with and superposed over said first line; and an aperture in said envelope, larger in area than any of said perforations, communicating with one of the perforations of at least one of said lines, said aperture being located so as to interrupt corresponding marginal edges of said front and said back, thereby providing a tear-starting notch at one edge of said envelope.

[7. A mailing envelope comprising: a front portion; a back portion; one of said portions being formed of initially transparent thermoplastic material; coating means on said one portion rendering said one portion at least partially at least translucent, said coating means comprising an ink which is adherent to thermoplastic material; and means joining said portions together.]

[8. The combination of claim 7, said coating means being an ink which is receptive to typed or printed indicia.]

9. The combination of claim [7] *10*, said envelope including label means, said label means being comprised of paper adhesively attached to an exterior surface of said [envelope] *mailing cover.*

*10. A mailing cover comprising: a rectangular front panel of initially transparent thermoplastic material, a rectangular back panel of thermoplastic material superimposed with the said front panel, a coating on exterior portions of the front panel suitable to receive printed or typed indicia such as postal indicia, and which renders such portions at least translucent and which also defines a transparent window area in the front panel, and heat seal means fusing said front and back panels together along lines adjacent marginal portions thereof.*

References Cited

The following references, cited by the Examiner, are of record in the patented file of this patent or the original patent.

UNITED STATES PATENTS

| | | | |
|---|---|---|---|
| 824,908 | 7/1906 | Cohn | 229—71 |
| 835,850 | 11/1906 | Cohn | 229—71 |
| 1,142,349 | 6/1915 | Merrill | 229—85 |
| 2,132,931 | 10/1938 | Bohn | 117—115 |
| 2,342,702 | 2/1944 | Sherman | 229—69 |
| 2,610,784 | 9/1952 | Henry | 229—69 |
| 2,682,206 | 6/1954 | Vogt | 229—69 |
| 2,684,613 | 6/1954 | Vogt | 93—1 |
| 3,026,018 | 3/1962 | Stratton et al. | 229—69 |
| 3,027,065 | 3/1962 | Lindquist et al. | 229—69 X |

DAVID M. BOCKENEK, *Primary Examiner.*